Patented Sept. 16, 1947

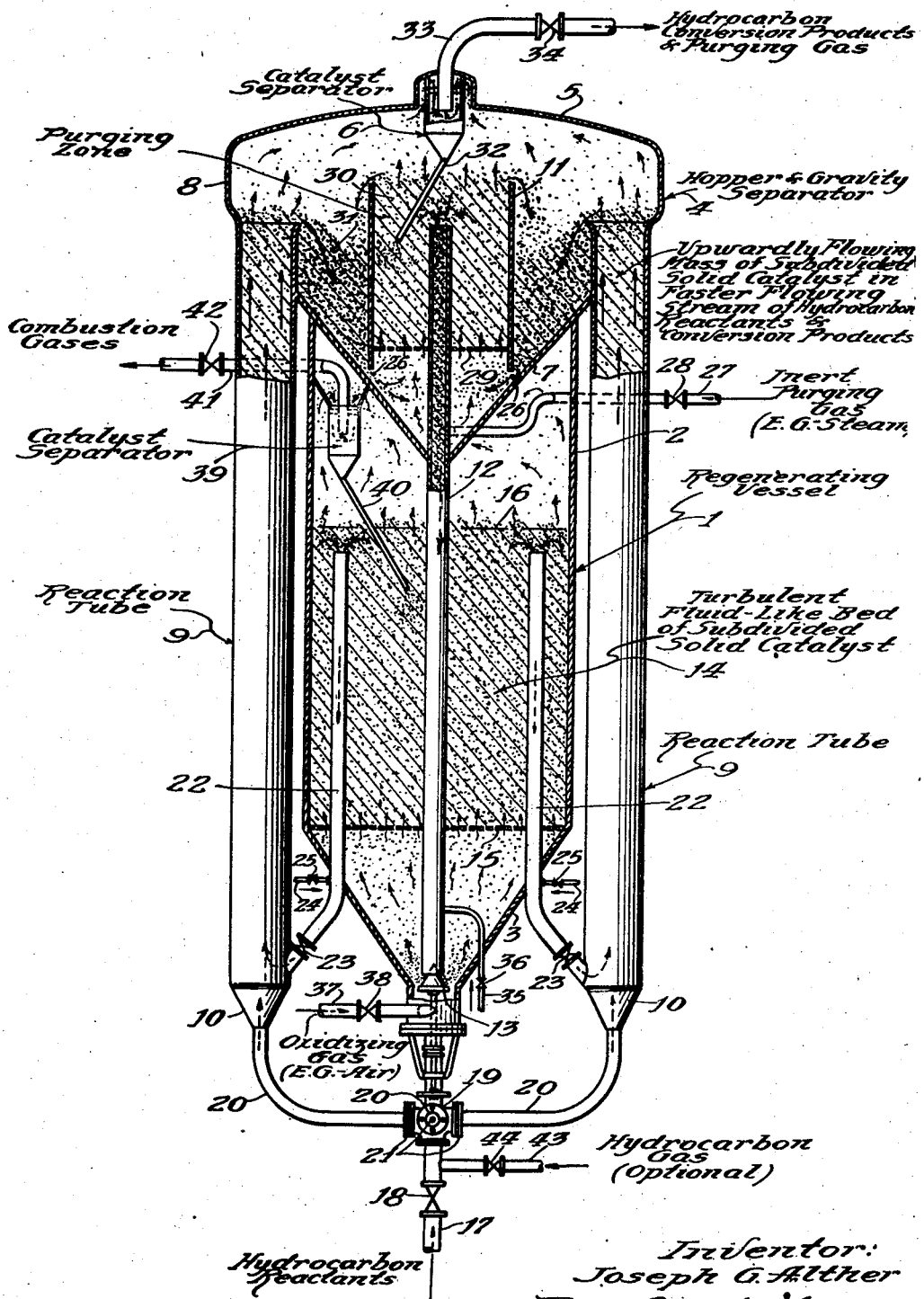

2,427,341

UNITED STATES PATENT OFFICE 2,427,341

CATALYTIC CONVERSION OF HYDRO-
CARBONS

Joseph G. Alther, Chicago, Ill., assignor to Universal Oil Products Company, Chicago, Ill., a corporation of Delaware Application September 24, 1943, Serial No. 503,638

7 Claims. (Cl. 196—52)

1

The invention relates to an improved process of the type in which fluid hydrocarbons are converted to more valuable products in the presence of subdivided solid catalyst which promotes the conversion reaction, accompanied by the simultaneous regeneration of such catalyst which has become contaminated with deleterious combustible products of the reaction and return of the regenerated catalyst to the reaction zone. The invention also provides an apparatus suitable for conducting the process.

The invention is particularly directed to the catalytic cracking of hydrocarbon oil for the production of substantial yields of aviation base and/or motor gasoline of high octane rating. However, the features of the invention will be found advantageous as applied to numerous other catalytically promoted hydrocarbon conversion reactions including the reforming of fractions boiling within the range of gasoline to improve their quality, the dehydrogenation of normally liquid and normally gaseous hydrocarbons, the aromatization or dehydrocyclization of hydrocarbons susceptible to such treatment and operations involving various combinations of such reactions. It is, therefore, not intended to limit the invention in its broader aspects to any specific hydrocarbon conversion reaction.

For the catalytic cracking of normally liquid hydrocarbons boiling above the range of gasoline and for the catalytic reforming of gasoline and naphtha fractions, the catalyst employed is preferably of the siliceous type comprising subdivided solid particles of silica composited with one or more metal oxides, alumina, chromia and magnesia being the metal oxides most commonly employed. This type of cracking or reforming catalyst may be prepared from natural clays or other alumino silicates or it may be prepared entirely or, in part, by synthesis of the desired ingredients. For example, the silica may be precipitated from a solution of sodium silicate or the like and the metal oxide or oxides may be precipitated from solutions of their salts. Preferably, to prevent damage or permanent impairment to the activity of the catalyst at the high temperatures commonly encountered in its regeneration, it is substantially freed of alkali metal compounds at some stage during its preparation so that the final catalyst is substantially free of such materials.

For promoting dehydrogenation and aromatization, the preferred catalyst comprises subdivided solid particles of alumina, composited with one or more other metal oxides, such as those of chromium, molybdenum, tungsten, vanadium, cerium, thorium and tin. In general, the higher valent formation of these metal oxides is preferred and chromium sesquioxide is the most commonly employed.

No novelty is claimed herein for any of the catalysts above mentioned, nor for the methods by which they may be prepared and it is entirely within the scope of the invention to utilize any other catalysts of known value for promoting the desired reaction so long as they are in the form of subdivided solid particles which can be made to flow through the system in the manner provided.

For the sake of conciseness and to avoid ambiguity, the features of the invention will be explained as applied to catalytic cracking. Their application to other catalytically promoted hydrocarbon conversion reactions will be apparent to those familiar with the art from this description.

The most advanced and successful process for the production of aviation base and motor gasolines of high octane rating from higher boiling hydrocarbon oils, by catalytic cracking, and from gasoline or naphtha fractions, by that form of cracking operation generally termed "catalytic reforming", involves continuous passage of the catalyst in series through separate confined reaction and regenerating zones, whereby to make the process continuous and avoid alternate use of the same reaction vessel in processing and regenerating service. In one highly advantageous process of this general type, the mass of catalyst being employed to promote the cracking reaction in the reaction zone and the mass of catalyst undergoing regeneration are maintained in a turbulent fluid-like condition resembling that of a boiling liquid. Fluidization of the catalyst mass or bed in the reaction zone is brought about by passing the fluid hydrocarbon reactants and resulting fluid conversion products upwardly therethrough at such a velocity that their lifting action on the catalyst particles partially counteracts the force of gravity. In the regenerating zone fluidization of the catalyst bed is accomplished by passing air, or other oxidizing gas employed for burning the combustible contaminants from the catalyst particles, and resulting combustion gases upwardly through the bed in the same manner. This results in pronounced hindered settling of the catalyst particles and their circulation within the fluid bed in both an upward and a downward direction with considerable turbulence in the bed.

One of the important objects of the invention is to provide a process of the general type above mentioned in which a turbulent fluid-like bed of subdivided solid catalyst particles is maintained in the regenerating zone, but in which the catalyst particles are transported upwardly through the reaction zone in the ascending stream of fluid reactants and resulting conversion products without substantial turbulence in the reaction zone. I do not mean to imply that the catalyst particles and the upwardly moving stream of fluid reactants and conversion products pass through the reaction zone at the same upward velocity but that there is not sufficient upward and downward movement of the catalyst particles to cause turbulence of the mass in the reaction zone.

It is now well known that the gas velocity can be regulated in relation to the average particle size of the catalyst to bring about the turbulent fluid-like condition above mentioned which I preferably employ in the regenerating zone. At a substantially higher gas velocity the catalyst particles will flow along in the gas stream at substantially the same velocity as the latter and have substantially the same residence time in the reaction zone. I have found that a velocity intermediate that which will produce pronounced hindered settling and turbulence and that at which strictly stream-line flow with no hindered settling is encountered will give a condition in which there is not sufficient hindered settling of the catalyst particles to cause turbulence, but at which the catalyst particles move upwardly through the reaction zone at a slower rate than the fluid reactants and conversion products. I believe that this difference between the rate of upward flow of the catalyst particles and the transporting stream of fluid is due principally to slippage therebetween and, although there is apparently some settling or back flow of the catalyst particles, particularly in the upper region of the reaction zone, it is not sufficient to cause the turbulence encountered at the lower velocity. The condition of limited hindered settling, without the creation of substantial turbulence, is employed in the reaction zone in accordance with the preferred embodiment of the invention, while a turbulent fluid-like condition is employed in the catalyst bed in the regenerating zone.

By employing a turbulent fluid-like catalyst bed in the regenerating zone I retain the advantage of substantially uniform temperature distribution throughout the bed, brought about by its turbulence, and thus avoid localized zones of excessively high temperature, such as encountered when it is attempted to regenerate the catalyst in the form of a relatively compact mass. Consequently an average regenerating temperature more closely approaching the permissible maximum may be employed without the danger of damaging the catalyst by localized excessively high temperature.

By passing the fluid reactants and conversion products upwardly through the reaction zone in contact with the catalyst particles at a velocity regulated to avoid pronounced hindered settling, but at a greater net upward velocity than that of the catalyst particles, I obtain concurrent flow for the catalyst and reactants in the reaction zone and I am able to transport the catalyst through the reaction zone in the ascending stream of reactants and fluid conversion products without a detrimental degree of turbulence and without keeping the reactants continually in contact with the same catalyst particles as they move through the reaction zone.

I desire to avoid pronounced turbulence in the reaction zone since I have found that this gives rise to bubbling or channeling of a substantial portion of the fluid reactants through the bed without good contact with the catalyst particles. It is detrimental in the reaction zone where the fluidizing medium comprises the reactants and resulting conversion products, since a substantial portion of the reactants will thus pass through the bed with little or no conversion or, in the absence of good contact with the catalyst, may encounter excessive thermal conversion, but it is not particularly objectionable in the regenerating zone where the fluidizing medium is air or other oxidizing gas and resulting combustion gases. In other words, the benefit of substantially uniform temperature distribution which results from the use of a turbulent fluid-like catalyst bed warrants its use in the regenerating step despite the fact that it requires the use of a somewhat greater quantity of oxidizing gas to obtain the desired degree of regeneration but, for other reasons, I prefer to avoid pronounced hindered settling of the catalyst particles and turbulence in the reaction zone.

To assist in obtaining the aforementioned desirable flow conditions in the reaction zone, I preferably employ an elongated relatively slender or tubular type reactor in place of the relatively large diameter cylindrical vessel commonly used in present commercial installations of the fluid bed type. To keep the reaction tube relatively small without exceeding the desired velocity in this zone and without sacrificing charging stock capacity, I preferably employ a plurality of such zones arranged for the flow of reactants, conversion products and catalyst upwardly therethrough in parallel, with provision for supplying substantially equal quantities of catalyst and fluid reactants to each and with provision for supplying contaminated catalyst discharged from the several reaction tubes to a common regenerating vessel from which the regenerated catalyst is returned in each of the reaction tubes.

To provide a method of maintaining a suitable velocity for the transporting fluid in the reaction zone and to provide a high degree of flexibility with respect to the rate of catalyst circulation through the system independent of the rate at which hydrocarbon reactants are supplied to the reaction zone, a regulated quantity of relatively inert fluid, such as hydrocarbon gases or steam, for example, may be supplied to the reaction zone with the hydrocarbon reactants to be converted. The use of such inert material will also be beneficial in many catalytic hydrocarbon conversion reactions which are advantageously conducted at a low effective pressure, since the inert gas will produce a partial pressure effect in the reaction zone. Thus, I may obtain an effective pressure equivalent to partial vacuum while operating at substantially atmospheric or superatmospheric gauge pressure in the reaction zone.

Another important feature of the invention which assists in the achievement of the desired flow conditions above mentioned in the reaction zone resides in the provision for discharging catalyst and the transporting vapors and/or gases from the upper end of the reaction zone into a separating zone and catalyst hopper of enlarged cross-sectional area, wherein gravitational separation of a major portion of the catalyst particles from the vapor-gas stream is effected by virtue of the reduced linear velocity of the latter. Preferably, this enlarged separating zone is mounted above the regenerating vessel and a relatively compact column of catalyst particles is transported by gravity from this relatively high point in the system to the lower portion of the regenerating vessel, wherein it is picked up by the incoming stream of oxidizing gas utilized to effect the regeneration and is carried therewith into the turbulent fluid-like bed maintained in the regenerating vessel. To complete the catalyst circuit, catalyst is preferably withdrawn from a relatively high point of the fluid bed in the regenerating zone and flows as one or a plurality of relatively compact columns downwardly into the lower portion of the reaction zone or into each of the several tubular members comprising this zone, wherein it is picked up by the incoming stream or streams of fluid reactants and any auxiliary gas employed and is transported through the reaction zone back into the catalyst hopper and separating zone.

As another important feature of the invention I preferably materially reduce the quantity of combustible hydrocarbons, which would otherwise be supplied with the catalyst from the reaction to the regenerating zone, by extensively stripping the catalyst of occluded volatile hydrocarbons following its discharge from the reaction zone and prior to its introduction into the regenerating zone. This extensive stripping is conveniently and preferably accomplished while maintaining the catalyst particles in the form of a turbulent fluid-like bed, by passing steam or other suitable relatively inert or non-combustible gas upwardly through the bed and discharging it therefrom into the aforementioned separating zone so that the hydrocarbon volatiles liberated from the catalyst mass commingle with the outgoing conversion products and are supplied therewith to the subsequent separating and recovery equipment.

The above mentioned feature of the invention should not be confused with the superficial purging commonly obtained in present fluid bed operation by passing steam or other relatively inert gas upwardly through a relatively dense downwardly moving column of catalyst particles in a section of the transfer lines through which the catalyst is transported between the reaction and regenerating zones. The latter method does not and cannot achieve the extensive stripping or substantial elimination of volatile hydrocarbons from the contaminated catalyst which is accomplished by the method and means herein provided. By employing the method herein provided as much as 50 weight percent, and in some instances even more, of the combustibles commonly carried by the catalyst particles from the reaction zone to the regenerating zone can be stripped from the catalyst, thus avoiding combustion of these valuable hydrocarbons in the regenerating step and considerably reducing the load on the regenerating equipment. Since the combustibles thus removed will be those which are relatively light and high in hydrogen as compared with the combustible deposits remaining on the catalyst, the formation of steam in the regenerating zone will not only be greatly reduced, but will be less per pound of combustibles burned in the regenerator. This is a pronounced advantage with many catalysts, and particularly the preferred type of cracking catalyst above mentioned, which are susceptible to damage by contact with large quantities of steam at the high temperatures employed in the regenerating step. In the preferred embodiment of the invention the combustibles carried by the catalyst passing from the reaction zone to the regenerating zone are reduced by at least 25 weight percent, and preferably more, before the catalyst enters the zone in which the residual combustible deposits are burned therefrom.

The aforementioned and other features of the invention will be apparent with reference to the accompanying diagrammatic drawing and the following description thereof. It will, of course, be understood that the invention is not limited to the specific form of apparatus illustrated in the drawing nor is it limited to the use of all of the advantageous features provided. However, many of the features have an interdependent and cooperative relationship when employed in combination and the invention is particularly directed to such advantageous and cooperative combinations of various features.

The drawing is an elevational view, shown principally in longitudinal section, of one specific form of apparatus embodying the aforementioned and other features of the invention and in which the improved process provided by the invention may be conducted.

Referring to the drawing, the apparatus here illustrated comprises a regenerating vessel 1 having a substantially cylindrical vertically disposed shell 2 and a substantially conical bottom head 3. Shell 2 is surmounted by a gravity separator and hopper 4 having a semi-elliptical upper head 5, in which the cyclone separator 6 is mounted, and a substantially conical bottom head 7 connected with the top head 5 by the relatively short cylindrical section 8. A portion of the bottom head 7 also serves as the top closure member for the regenerating zone and extends outwardly beyond the cylindrical shell 2 of the regenerator to receive the upper ends of the reaction tubes 9 which are disposed at a plurality of spaced points about the periphery of the regenerator shell and extend vertically downward to approximately the lower end of the regenerator. The reaction tubes 9 each terminate in a substantially conical bottom closure member 10 and are open at their upper ends to communicate with the hopper and gravity separator 4.

Although the provision of a purging zone and its location are not limiting features of the invention, a purging zone is provided in the case illustrated within hopper 4 and is defined by the substantially cylindrical member 11 which extends from the space enclosed by shell 8 of the hopper downwardly to an elevation slightly above that at which it would join the cone bottom 7 of the hopper, the central portion of the latter also serving as the bottom closure member of the purging zone.

A standpipe 12 which serves as a transfer line through which a relatively dense column of contaminated catalyst is supplied from the upper portion of the purging zone to the lower portion of the regenerating vessel is open at its upper and lower ends and terminates at its lower end adjacent a flow regulating member 13 which is adjustable to vary the opening through which the catalyst flows from the lower end of standpipe 12 into the regenerator.

A turbulent fluid-like bed of subdivided solid catalyst indicated at 14 is maintained within the regenerator, extending within the latter from the perforate plate or distributing grid 15, which is provided across the regenerator at approximately the juncture of shell 2 with head 3, to an elevation which is preferably somewhat below the lower extremity of member 7. The approximate upper extremity of the turbulent fluid bed 14 is indicated by the broken line 16.

In operation the hydrocarbon reactants to be converted are supplied, preferably in vaporous state, and heated to approximately the desired reaction temperature through line 17 and valve 18 to a suitable distributing header 19 wherefrom they are directed in substantially equal quantities through the branch lines 20 to the lower portion of each of the reaction tubes 9. Valves may be provided, when desired, in lines 20 for obtaining substantially equal distribution of the reactants to the several reaction tubes but, in the case illustrated, this is accomplished by means of the orifice plates indicated at 21. In the conversion of liquid charging stock it may, when desired, be supplied to the reaction tubes in liquid state and either preheated or at substantially atmospheric temperature, in which case it will be heated and vaporized by contact with the hot regenerated catalyst in the lower portion of the reaction tubes.

Hot regenerated catalyst is directed from any desired point in the turbulent fluid bed 14 of the regenerator, and in this case from the upper portion of the bed, downwardly through the standpipes 22 and the adjustable orifices or flow control valves 23 provided adjacent the lower end of the standpipes into the lower portion of each of the reaction tubes 9 in substantially equal amounts. When desired, to obtain substantially uniform distribution of the hot regenerated catalyst to the reaction tubes, fixed orifices may be provided in the standpipes 22 in place of the adjustable members 23. In any case, there is preferably a slight pressure drop for loss of hydrostatic head as the catalyst enters the reaction tubes from standpipes 22.

The catalyst moves downwardly through each of the standpipes as a relatively compact column and steam or other suitable relatively inert gas is preferably supplied to each of the standpipes on the upstream side of members 23 or the substitute fixed orifices, not indicated, in relatively small amounts regulated to prevent excessive compaction of the columns. Lines 24 and valves 25 are provided for this purpose. Preferably, the quantity of relatively inert gas thus supplied to standpipe 22 is also sufficient to prevent the substantial transfer of oxidizing gas and combustion gases from the regenerating zone to the reaction zone with the regenerated catalyst, but such stripping need not be as extensive or complete as that afforded in the preferred embodiment of the invention, as will be later described, to the contaminated catalyst passing from the reaction zone to the regenerating zone.

Hot regenerated catalyst supplied, as above described, to the lower portion of the reaction tubes 9 is picked up by the incoming fluid reactants from lines 20 and transported upwardly through the reaction tubes, preferably under the non-turbulent flow conditions previously described. Conversion of the fluid reactants takes place during their contact with the catalyst in tubes 9 and resulting fluid conversion products and catalyst particles containing deleterious heavy contaminants formed by the reaction and occluded lighter hydrocarbons pass from the upper end of the reaction tubes into the catalyst hopper and gravity separator 4. Here a material reduction in the linear velocity of the fluid conversion products, by virtue of the increased cross-sectional area of the zone into which the catalyst and conversion products are discharged, causes substantial settling of the catalyst particles to effect the separation of a major portion thereof from the bulk of the vaporous and gaseous products.

The contaminated catalyst particles pass downwardly through the conical section of separator 4 into the lower portion of the space circumscribed by member 11 through a continuous opening 26 provided between the lower extremity of member 11 and the cone bottom 7 of the hopper. When desired, a plurality of spaced ports may be provided through the lower portion of member 11 in place of the continuous opening 26. The contaminated catalyst particles are then picked up in the incoming stream of steam or other relatively inert non-combustible purging gas, supplied through line 27 and valve 28, and are transported upwardly through the purging zone and substantially stripped by the purging gas of occluded light hydrocarbons.

A perforate plate or other distributing member 29 is provided across the lower portion of the purging zone to substantially uniformly distribute the catalyst particles and purging gas therein. Preferably, the upward velocity of the purging gas is regulated to maintain a turbulent fluid-like bed of the catalyst particles, such as indicated at 30, in the purging zone and the materially reduced velocity of the purging gas and volatile hydrocarbons leaving the upper portion of this zone causes substantial separation of the catalyst particles therefrom adjacent the upper end of member 11. The upper extremity of the fluid bed 30 may be maintained somewhat beneath the upper extremity of member 11 or, by increasing the quantity of purging gas supplied through line 27 and valve 28, it may be carried at a sufficiently higher level that catalyst will spill over the upper extremity of member 11 and fall back into the relatively compact mass 31 of catalyst particles passing from the reaction tubes to the purging zone, so as to obtain recirculation through the latter.

The purging gas and volatiles stripped from the catalyst in the purging zone commingle in the upper portion of separator 4 with the outgoing vaporous and gaseous conversion products and the mixture is directed with the relatively small amount of entrained catalyst particles into separator 6 which, in the case illustrated, is a separator of the centrifugal or cyclone type. Catalyst particles separated from the outgoing vapors and gases in separator 6 are returned, in the case illustrated, through standpipe 32 to the fluid bed 30 in the purging zone, although they may, when desired, be returned to the relatively compact bed 31 or to the relatively dense column of catalyst particles passing through conduit 12 to the regenerating zone. Vapors and gases from which all or a major portion of the catalyst particles have been separated are directed from separator 6 through line 33 and valve 34 to suitable fractionating and recovery equipment, not illustrated.

Conduit 12 terminates in the case illustrated, in the upper portion of the fluid bed 30 within the purging zone and a relatively dense column of substantially stripped catalyst particles flows downward from the fluid bed in the purging zone through conduit 12 into the lower portion of the regenerating vessel at a rate controlled by the adjustment of member 13. Preferably, to prevent excessive compaction of the column of catalyst particles in conduit 12, a regulated relatively small amount of steam or other suitable relatively inert gas is supplied to this conduit through line 35 and valve 36 to insure the continuous flow of catalyst particles through the conduit.

Air or other suitable oxidizing gas is supplied to the lower portion of the regenerating vessel through line 37 and valve 38 and picks up the incoming catalyst particles from conduit 12. The oxidizing gas and catalyst particles are uniformly distributed over the cross-sectional area of the regenerating zone by the distributing member 15 and the quantity of oxidizing gas supplied to the regenerator is regulated to maintain the turbulent fluid-like bed 14 of catalyst particles in the regenerator. Combustion gases formed by burning of the deposited contaminants from the catalyst particles in bed 14 are disengaged from a major portion of the catalyst particles at substantially the upper extremity 16 of the fluid bed and are directed with the relatively small amount of remaining entrained catalyst particles to separator 39. Separator 39 is also of the centrifugal or cyclone type, in the case illustrated, and catalyst particles separated from the outgoing combustion gases in this zone are directed through standpipe 40 back into the fluid bed 14, while the combustion gases from which all or a major portion of the catalyst particles have been separated are discharged through line 41 and valve 42, preferably to suitable heat recovery equipment, not illustrated.

It is, of course, entirely within the scope of the invention to eliminate members 11 and 29 in the catalyst hopper and separator 4 and terminate conduit 12 at its juncture with member 7, thus eliminating the extensive and substantially complete purging of the catalyst particles passing from the reaction zone to the regenerating zone. In such instances the quantity of steam or other relatively inert gas supplied through line 35 and valve 36 of conduit 12 is preferably increased over that otherwise required so as to obtain some stripping of light occluded hydrocarbons from the column of catalyst particles passing through conduit 12.

Due to the length and substantially compact condition of the column of catalyst particles passing through conduit 12 and the fluid-like condition of the bed 14 in the regenerator, the hydrostatic pressure at the discharge end of conduit 12 immediately above member 13 is greater than that in the zone into which the catalyst from this column is discharged, so that a flow of catalyst particles downwardly through conduit 12 and upwardly into and through the fluid bed 14 in the regenerator is maintained. Member 13 is adjusted to control the pressure drop at the discharge end of conduit 12. The catalyst circuit is completed through standpipes 22 and the tubes 9 by virtue of the fact that the density and weight of the column of catalyst in each of the standpipes 22 is greater than in the communicating reaction tubes 9. The force which effects circulation is the kinetic energy of the incoming streams of fluid reactants and oxidizing gas.

When desired, for the purpose previously explained, suitable relatively non-reactive gas, such as, for example, steam or hydrocarbon gas derived from within the system or from an external source may be supplied in regulated amounts through line 43 and valve 44 to line 17, from which it passes with the incoming hydrocarbon reactants through the header or distributing member 19 and lines 20 to the reaction tubes 9 to increase the linear velocity of the ascending stream of fluid which transports the catalyst particles through the reaction tubes.

In many instances even with the substantially complete removal of light occluded hydrocarbons from the contaminated catalyst before the latter enters the regenerating zone, burning of the remaining combustibles in the regenerator will store sufficient heat in the regenerated catalyst to satisfy the thermal requirements of the endothermic conversion reaction taking place in the reaction tubes 9 and a substantial thermal balance can be achieved between the reaction and regenerating steps by control of the rate at which catalyst is circulated through the system. By the use of auxiliary transporting fluid supplied through line 42 and valve 43, as previously described, this rate of circulation may be increased to any desired degree within reasonable limits without necessarily increasing the hydrocarbon feed rate to the reaction tubes. However, I prefer to keep the catalyst circulation rate at a relatively low value in relation to the hydrocarbon feed rate, for example, within the limits of 1 to 10 pounds of catalyst per pound of hydrocarbon reactants. When the rate of circulation obtained with a catalyst-oil ratio within the range above given will not achieve substantial thermal balance between the reaction and regenerating steps I prefer to provide suitable well known means, not illustrated, for increasing the heat input to the reaction zone or for abstracting excess heat from the regenerating zone.

Additional heat may be supplied to the reaction zone, for example, by external heating of the reaction tubes 9 and/or by preheating the hydrocarbon reactants supplied through line 17 and/or any inert gas supplied through line 43. Preferably, however, the degree of preheat in these streams does not materially exceed the temperature at which it is desired to conduct the conversion reaction.

When excess heat is generated by burning of the combustible contaminants from the catalyst in the regenerating step, a stream of hot catalyst particles may be withdrawn from the fluid bed 14 and passed through a suitable cooler, such as a waste-heat boiler or a preheater for the hydrocarbon reactants or inert gas, and the resulting cooled catalyst returned to a lower point in the regenerator. This general method of abstracting excess heat from the regenerating step is now commonly employed in fluid bed operations and no novelty is claimed for it herein except in combination with other features of the invention.

It should also be understood that the invention incorporates features which will be found advantageous regardless of the particular flow conditions employed in the reaction zone and that the invention is therefore not strictly limited to the preferred flow conditions above described in this zone, it being within the scope of the invention to maintain a turbulent fluid-like bed of catalyst particles in the reaction zone, when desired.

I claim as my invention:

1. A process for the conversion of fluid hydrocarbons in contact with subdivided solid catalyst which promotes the conversion reaction, comprising supplying a quantity of said hydrocarbons to the lower portion of each of a plurality of vertically elongated confined reaction zones, simultaneously supplying to the lower portion of each of said reaction zones a quantity of hot regenerated catalyst particles from a confined regenerating zone, maintaining a temperature suitable for conducting the conversion reaction in said reaction zones, passing the mixture of reactants, catalyst particles and resulting fluid conversion products upwardly through each of said zones and therein effecting the conversion reaction, discharging the resulting mixture of fluid conversion products and catalyst particles contaminated with deleterious combustible products of the conversion reaction from the upper portion of each of said reaction zones into an enlarged catalyst separating chamber disposed above said regenerating zone, therein effecting separation of a major portion of the contaminated catalyst particles from said fluid conversion products by a substantial reduction in their upward velocity, supplying contaminated catalyst downwardly by gravity from the separating chamber directly into the lower portion of said regenerating zone, maintaining a turbulent fluid-like bed of the catalyst particles in said regenerating zone and burning combustible contaminants therefrom by passing oxidizing gas upwardly through the regenerating zone in contact with the catalyst, and supplying resulting hot regenerated catalyst directly by gravity from said fluid-like bed in the regenerating zone to the lower portion of each of said reaction zones as aforesaid.

2. A process such as defined in claim 1 wherein the catalyst discharged from the reaction zones is substantially stripped of occluded light hydrocarbons prior to its introduction into the regenerating zone by passing relatively inert non-combustible gas upwardly through a mass of the catalyst particles maintained within said separating chamber.

3. The process of claim 1 further characterized in that the catalyst particles move upwardly through the reaction zones at a velocity less than that of the hydrocarbons but without substantial back flow of the catalyst particles and turbulence in the reaction zones.

4. The process of claim 1 wherein the ratio of catalyst to said hydrocarbon reactants in the reaction zones is kept at a higher value than that at which substantially non-turbulent flow would normally be obtained therein and wherein substantially non-reactive fluid is supplied to the reaction zones in quantities regulated to maintain substantially non-turbulent flow through the reaction zones.

5. The process of claim 1 wherein said conversion reaction comprises catalytic cracking and the catalyst comprises a siliceous cracking catalyst.

6. A hydrocarbon conversion process which comprises introducing the hydrocarbons to the lower portion of a vertically elongated reaction zone, simultaneously supplying hot regenerated catalyst to the lower portion of said zone from a regenerating zone, passing the resultant mixture of hydrocarbons and catalyst upwardly through the reaction zone and therein effecting substantial conversion of the hydrocarbons, discharging the admixed conversion products and contaminated catalyst particles from the upper portion of the reaction zone into a separating zone disposed above said regenerating zone, reducing the upward velocity of the mixture in the separating zone to separate contaminated catalyst particles from the conversion products, accumulating the separated particles in a substantial body in the separating zone, stripping the separated particles of occluded volatile hydrocarbons in the separating zone by passing a relatively inert gas upwardly through said body at a velocity such as to maintain said body in a turbulent fluidized condition and to transport the particles in an upward direction within the separating zone, passing contaminated catalyst particles downwardly by gravity from a point substantially above the bottom of the fluidized body in the separating zone to said regenerating zone, maintaining a turbulent fluid-like bed of catalyst particles in the regenerating zone and therein burning contaminants from the catalyst, and supplying resultant hot regenerated catalyst from said bed in the regenerating zone to the lower portion of the reaction zone as aforesaid.

7. The process as defined in claim 1 further characterized in that said major portion of the contaminated catalyst particles is accumulated in a substantial body in the separating chamber and a relatively inert gas passed upwardly through said body at a velocity such as to maintain the latter in a turbulent fluid-like condition, whereby to strip the catalyst particles of occluded volatiles.

JOSEPH G. ALTHER.

REFERENCES CITED

The following references are of record in the file of this patent:

UNITED STATES PATENTS

| Number    | Name            | Date           |
|-----------|-----------------|----------------|
| 2,271,148 | Becker et al.   | Jan. 27, 1942  |
| 2,302,209 | Goddin          | Nov. 17, 1942  |
| 2,307,879 | Cornell         | Jan. 12, 1943  |
| 2,311,564 | Munday          | Feb. 16, 1943  |
| 2,320,562 | Bransky         | June 1, 1943   |
| 2,311,984 | Guild           | Feb. 23, 1943  |
| 2,240,347 | Page et al.     | Apr. 29, 1941  |
| 2,246,654 | Arveson         | June 24, 1941  |
| 2,266,161 | Campbell et al. | Dec. 16, 1941  |
| 2,284,603 | Belchetz et al. | May 26, 1942   |
| 2,296,722 | Marancik et al. | Sept. 22, 1942 |
| 2,303,047 | Hemminger       | Nov. 24, 1942  |
| 2,322,075 | Tyson           | June 15, 1943  |
| 2,325,516 | Holt et al.     | July 27, 1943  |
| 2,326,705 | Thiele et al.   | Aug. 10, 1943  |
| 2,341,193 | Scheineman      | Feb. 8, 1944   |
| 2,348,646 | Reeves          | May 9, 1944    |
| 2,231,424 | Huppke          | Feb. 11, 1941  |
| 2,339,874 | Nysewander      | Jan. 25, 1944  |
| 2,344,900 | Reeves et al.   | Mar. 21, 1944  |
| 2,348,418 | Roesch et al.   | May 9, 1944    |
| 2,360,787 | Murphree et al. | Oct. 17, 1944  |
| 2,304,128 | Thomas          | Dec. 8, 1942   |
| 2,367,281 | Johnson         | Jan. 16, 1945  |
| 2,331,433 | Simpson et al.  | Oct. 12, 1943  |